United States Patent

Schiefen

[11] 3,877,288
[45] Apr. 15, 1975

[54] MACHINE FOR CHECKING EFFECTIVENESS OF VIBRATION DAMPERS OR SHOCK ABSORBERS ON MOTOR VEHICLES

[75] Inventor: Alfred Schiefen, Windeck, Germany
[73] Assignee: Boge GmbH, Eitorf, Sieg, Germany
[22] Filed: Mar. 9, 1973
[21] Appl. No.: 339,879

[52] U.S. Cl. .................................. 73/11; 73/71.7
[51] Int. Cl. ....................................... G01m 17/04
[58] Field of Search .......... 73/1 DV, 11, 67.1, 71.7, 73/432 A, 146

[56] References Cited
UNITED STATES PATENTS

| | | | |
|---|---|---|---|
| 965,911 | 8/1910 | Knickerbocker et al. | 73/146 X |
| 2,277,699 | 3/1942 | Guibert et al. | 73/432 A X |
| 2,934,940 | 5/1960 | Beissbarth | 73/11 |
| 3,720,091 | 3/1973 | Kiefer | 73/11 |

FOREIGN PATENTS OR APPLICATIONS 1,232,372  1/1967  Germany ................ 73/11

Primary Examiner—Charles A. Ruehl
Attorney, Agent, or Firm—Larson, Taylor & Hinds

[57] ABSTRACT

A device for checking the effectiveness of vibration dampers or shock absorbers associated with vehicle wheels includes a vertically vibratable platform onto which the vehicle wheel is driven, and a drive device connected through a spring for vertically vibrating this platform and hence vibrating the wheel and its axle. When the drive is terminated the ensuing vibrations are measured by the cooperation between a stylus which moves with the platform and a recording medium fixed to the frame. The vibrating wheel will pass through its complete range of frequencies before coming to a standstill. The amplitude at the point of resonance is related to and indicative of the effectiveness of the damping action. Both the stylus and the recording medium are adjustable on the parts on which they are mounted to vary the starting positions of these elements relative to each other.

5 Claims, 1 Drawing Figure

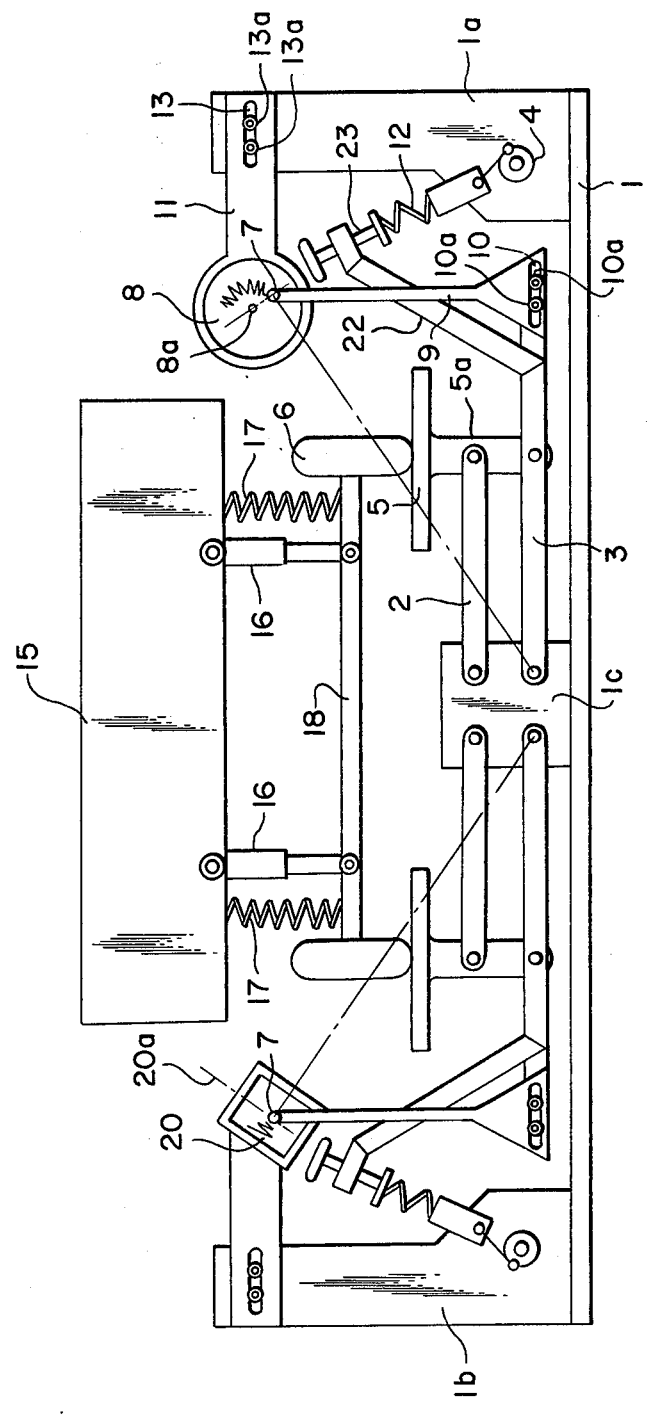

MACHINE FOR CHECKING EFFECTIVENESS OF VIBRATION DAMPERS OR SHOCK ABSORBERS ON MOTOR VEHICLES

BACKGROUND OF THE INVENTION

This invention relates to the checking of vehicle wheel vibration dampers while on the vehicle.

In the German Pat. No. 1,232,372, which is incorporated herein by reference, there is shown an arrangement in which the effectiveness of vibration dampers is checked by driving the wheel, the vibration dampers of which are to be checked, onto a wheel platform, at which time the platform is vibrated by an external driving means, and the vibrations of the wheel platform are measured and/or recorded after termination of the vibratory drive.

The present invention relates to an improvement in such a device.

SUMMARY OF THE INVENTION

It is a purpose of the present invention to provide an improved vibration damper checking device of the type described, and in particular, it is a purpose of the present invention to provide in such a device an improved recording means for recording the vibrations of the wheel platform relative to a fixed frame.

This purpose of the present invention is achieved by providing a stylus which normally moves with the wheel platform and which cooperates with a recording medium, the latter being fixed to the frame. In accordance with the features of the present invention, the stylus which moves with the platform is initially adjustable relative thereto and the recording medium is initially adjustable relative to the frame. As a result thereof, one can vary the starting position of the stylus relative to the recording medium for any given test.

In accordance with a preferred embodiment of the invention, the wheel platform is connected to the fixed frame by means of a pair of parallel links, and the stylus is connected onto one of these links. The stylus therefore moves when the wheel platform moves, but not in exactly the same direction. Rather, the stylus tends to move through a slightly arcuate movement about the pivot connection of its respective control lever with the frame. This motion is utilized to effect movement of the stylus radially relative to the circular face of a recording medium.

Thus, it is an object of this invention to provide a new and improved recording device for a vibration damper checking device of the type described.

It is another object of this invention to provide for a vibration damper checking device of the type described, a recording mechanism, the starting position of which can be varied.

Other objects and the advantages of the present invention will become apparent from the detailed description to follow, together with the accompanying drawings.

BRIEF DESCRIPTION OF THE DRAWING

There follows a detailed description of a preferred embodiment of the invention which is to be read together with the accompanying single feature which is a schematic view of the essential parts of the present invention.

DETAILED DESCRIPTION OF THE PREFERRED EMBODIMENT

Referring now to the drawing, there is shown a frame 1 having uprights 1a and 1b and a central part 1c. A vibration damper checking mechanism is mounted on each side of the fixed part 1c. Since the two mechanisms on each side of 1c are virtually identical to each other, only the mechanism on the righthand side will be discussed in detail. A pair of control levers 2 and 3 are pivotably connected at their first ends to the frame part 1c. These levers are pivotably connected also to the stem 5a of the wheel platform 5. The lower control lever 3 extends beyond the stem 5a and includes an upwardly projecting extension 22 having journalled in the upper end thereof a rod 23 which at its lower end abuts a spring 12 which at its other end is connected to the driving means 4. The rod 23 includes a handle at its upper end and it is adjustable along its axis through the top of extension 22, for example by screw threads or the like, to adjust spring 12. A lower extension from the control lever 3 includes a part having a pair of bolts 10a threadedly engaged therewith. Mounted on these bolts is a stylus holding mechanism 9 which at its upper end holds a stylus 7. At its lower end, the holding member 9 includes an elongated slot 10 located on the bolts 10a. Thus, when the bolts 10a are loosened, the member 9 can move horizontally for adjustment purposes. When a selected position has been reached, the bolts 10 are tightened, firmly holding the member 9 to the control lever 3. At the upper end of frame part 1a there is provided a pair of bolts 13a threadedly engaged therewith. Mounted on these bolts is a recorder holding mechanism 11, the mechanism being connected onto the bolts 13a by means of elongated slot 13. At the opposite end of mechanism 11 there is provided a recording medium 8, the circular surface of which cooperates with the stylus 7. Means not shown would cause the surface of 8 to turn about axis 8a so that the separate lines corresponding to the separate vibrations of the wheel platform 5 will be visually presented on the recording medium.

As indicated above, the mechanism on the lefthand side associated with frame part 1b is substantially identical to the righthand mechanism. However, one possible variation of the invention is shown here. Instead of the flat face circular recording medium 8, there can be provided for cooperation with the stylus 7 a recording medium 20 in the form of a cylinder rotatable about axis 20a.

Also shown in the figure is a representation of a vehicle 15 having shock absorbers 16 and springs 17 connecting the body of the vehicle 15 with the axle 18, on the ends of which are mounted wheels 6 which rest on the wheel platform 5.

The operation of the illustrated device is as follows. The vehicle is placed with the wheels to be tested onto the appropriate wheel platforms and the driving mechanism 4 is started, thus vibrating or oscillating the wheel platform 5, wheel 6, and the adjacent axle 18. After the drive has been switched off, the wheel and its associated adjacent axle can oscillate freely and thus pass through its complete range of frequencies before coming to a standstill. The oscillating resonance will be shown on the diagram. Limiting values have been established for each type of vehicle, and thus the diagram can be evaluated and information given on the functional efficiency of the tested shock absorbers, in a manner known in the art.

At times it will be necessary or at least desirable to change the starting position of the stylus relative to the recording medium 8. For this purpose, and in accordance with features of the present invention, the position of stylus 7 can be changed by loosening the bolts 10a and adjusting the stylus holding member 9 horizontally to the appropriate position and then tightening the bolts 10a, and the horizontal position of recording medium 8 can also be adjusted by loosening the bolts 13a and sliding the mechanism 11 horizontally to the desired position and then again tightening the bolts 13a.

Although the invention has been described in considerable detail with respect to a preferred embodiment thereof, it will be apparent that the invention is capable of numerous modifications and variations apparent to those skilled in the art without departing from the spirit or scope of the invention.

I claim:

1. A device for checking the effectiveness of vibration dampers associated with the wheels of a vehicle while on a vehicle, comprising: fixed frame support means; a wheel platform on which the wheel rests while still on the vehicle; a pair of generally horizontal parallel control levers pivotably connected at one of their ends to the frame means and pivotably connected to the wheel platform to support said platform for vertical oscillation; drive means for vibrating the wheel platform vertically to thus stimulate the mass of the wheel into co-vibration and hence operate the vibration dampers; spring means resiliently interconnecting the drive means and the wheel platform; and a recording means for recording the amplitude of the vibrations of the wheel platform, said recording means including a stylus operatively connected to the upper end of a stylus support member carried by and upstanding from one only of said levers, whereby the stylus moves over an arcuate path having a radius extending from said stylus to the pivotal connection of said one lever to said frame means, a recording medium carried by the frame and positioned to be engaged by the stylus as the latter moves to record the vibrations thereon, said recording medium being mounted for movement in a direction transversely of the path of said stylus, and means for adjustably connecting the lower end of the stylus support member to said one lever and adjustably connecting said recording medium to the frame for varying the starting position of the stylus on the recording medium.

2. Apparatus as claimed in claim 1 wherein said recording medium is a flat surface rotatably driven about its center, and said stylus is positioned such that a line passing through said stylus and tangent to its arcuate path passes through said center of rotation of said recording medium.

3. Apparatus as claimed in claim 1 wherein said recording medium is a cylindrical surface rotatably driven about its longitudinal axis, and said longitudinal axis is oriented parallel to a line passing through said stylus and tangent to its arcuate path.

4. A device according to claim 1, said recording medium being a flat circular rotating surface, said stylus positioned to move generally radially over said surface as the wheel platform vibrates.

5. A device according to claim 1, said recording medium being a cylinder, and said stylus positioned to record on the surface of the cylinder.

* * * * *